United States Patent Office 2,963,078
Patented Dec. 6, 1960

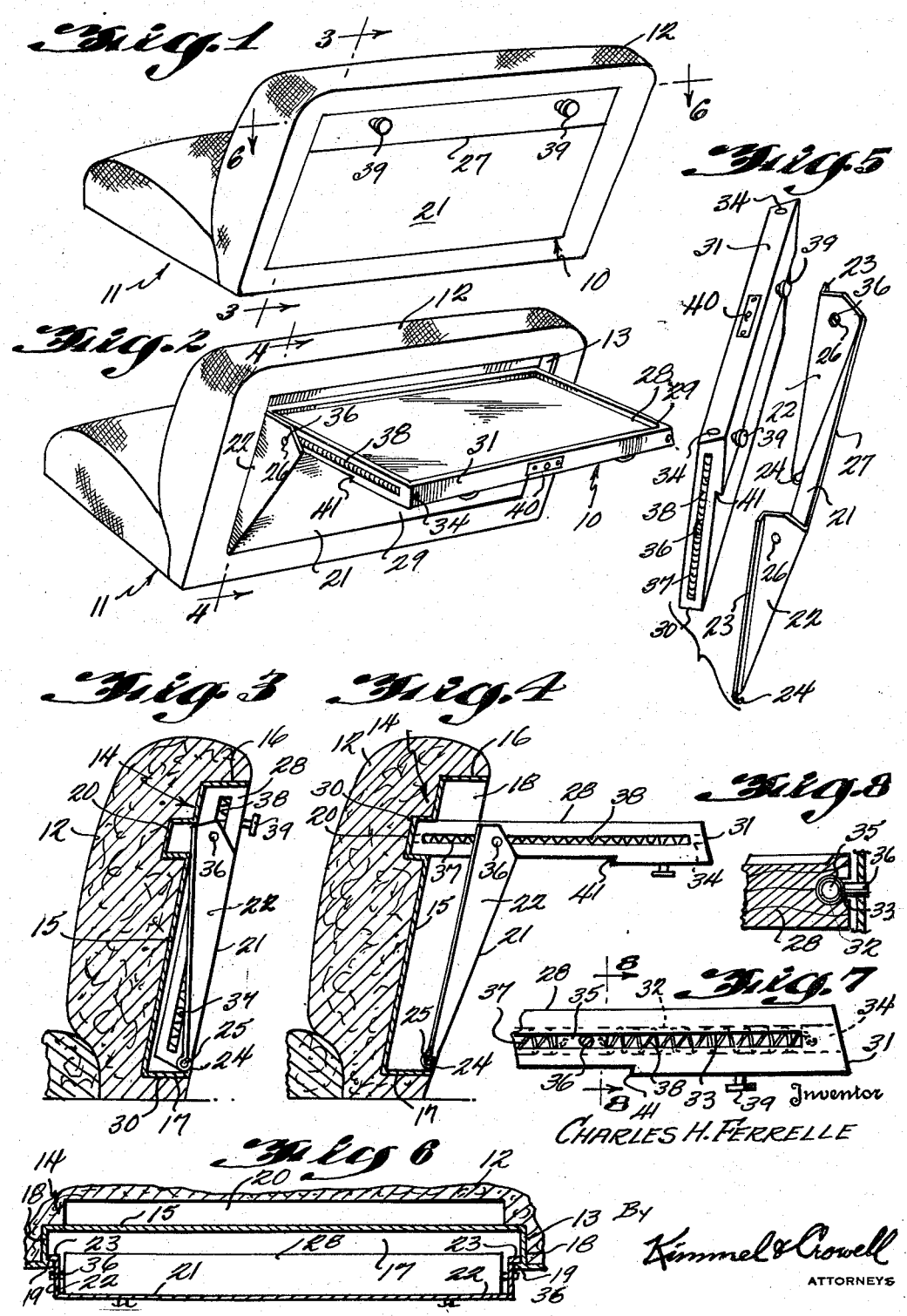

2,963,078

FOLDING TABLE FOR MOTOR VEHICLES

Charles H. Ferrelle, 740 E. Henry St., Savannah, Ga.

Filed Nov. 19, 1959, Ser. No. 854,121

2 Claims. (Cl. 155—123)

The present invention relates to a folding table for motor vehicles and particularly to such a table which is capable of being stored and is an improvement on my prior Patent No. 2,284,811, issued June 2, 1942, entitled "Folding Table."

The primary object of the invention is to provide a table structure of the class described above in which the table is braced from below so that the table surface is relatively unobstructed.

Another object of the invention is to provide a motor vehicle table of the class described above in which a plurality of springs are used to maintain the table in a storage position and in an extended position ready for use.

A further object of the invention is to provide a motor vehicle table of the class described above in which the table is substantially enclosed when in a stored position.

Other objects and advantages will become apparent in the following specification when considered in light of the attached drawings, in which:

Figure 1 is a perspective view of the invention illustrated in attached closed position on a motor vehicle seat back;

Figure 2 is a perspective view similar to Figure 1 of the invention shown in open position;

Figure 3 is a longitudinal vertical sectional view taken along the line 3—3 of Figure 1, looking in the direction of the arrows;

Figure 4 is a longitudinal vertical sectional view taken along line 4—4 of Figure 2, looking in the direction of the arrows;

Figure 5 is an exploded perspective view of the table and its combined cover and brace;

Figure 6 is a horizontal transverse sectional view taken along the line 6—6 of Figure 1, looking in the direction of the arrows;

Figure 7 is a fragmentary side elevation of the table edge illustrating the spring mounting; and Figure 8 is a fragmentary vertical section taken along the line 8—8 of Figure 7, looking in the direction of the arrows.

Referring now to the drawings in detail wherein like reference characters indicate like parts throughout the several figures, the reference numeral 10 indicates generally a motor vehicle table constructed in accordance with the invention.

The motor vehicle table 10 is used with a motor vehicle seat, indicated generally at 11, having an upwardly extending back 12 including a generally rectangular recess 13 in the rear side thereof. A metallic housing, generally indicated at 14, is positioned in the recess 13 and includes a generally rectangular inner wall 15, a top wall 16 integrally secured thereto and extending outwardly therefrom, and a bottom wall 17 integrally secured to the inner wall 15 and positioned in spaced parallel relation to the top wall 16. The casing 14 has a pair of spaced apart parallel side walls 18 integrally secured to opposite side edges of the inner wall 15 and connecting the opposite end edges of the top wall 16 with the bottom wall 17.

The side walls 18 have inwardly extending opposed flanges 19 integrally formed on the edge thereof opposite the back wall 15, as can be seen in Figure 6. A generally rectangular transversely extending horizontal socket 20 is integrally formed in the back wall 15, for reasons to be assigned.

A generally rectangular cover and brace plate 21 has a pair of substantially triangular integral side walls 22 extending perpendicularly thereto. The side walls 22 each have an integral flange 23 extending perpendicularly outwardly from the edge thereof opposite the cover and brace plate 21. The side walls 22 have arcuate hooks 24 formed on the lower end thereof for pivotal engagement with pivot pins 25 fixedly mounted on the lower end of the side walls 18 of the recess 13. The plate 21 has the sides 22 thereof positioned between the sides 18 of the case 14. The flanges 23 on the side walls 22 are arranged to engage the flanges 19 on the side walls 18 so that the plate 21 is limited in its outward swinging movement with respect to the case 14. The side walls 22 are each provided with a bore 26 adjacent the upper end thereof, for reasons to be assigned. The panel 21 has a generally horizontal transverse upper edge 27 extending from one side wall 22 to the other side wall 22. The upper edge 27 is spaced below the top wall 16 of the housing 14.

A generally rectangular table 28 has a pair of spaced parallel opposite side edges 29, an inner edge 30 and an outer edge 31. The edges 30, 31 are arranged in opposed relation.

The table 28 is provided with an elongated cylindrical guideway 32 arranged adjacent and parallel to each of the side edges 29 thereof. An elongated slot 33 opens from each of the guideways 32 through the adjacent side edge 29. The guideways 32 open at their opposite ends through the inner edge 30 and the outer edge 31 of the table 28. The slots 33 terminate adjacent to but spaced from the inner edge 30 and the outer edge 31 of the table 28. A cylindrical plug 34 is detachably engaged in each end of each of the guideways 32. A slider 35 of generally cylindrical form is mounted for sliding movement in each of the guideways 32.

A stub shaft 36 is journalled in each of the sliders 35 for rotation therein. The stub shafts 36 pass through the slots 33 and extend beyond the respective side edges 29 of the table 28. The stub shafts 36 have their outer ends welded rigidly in the bores 26 to secure the table 28 to the plate 21.

A pair of springs 37, 38 are mounted in each of the guideways 32 on opposite sides of the slider 35. The coil springs 37, 38 are secured to the slider 35 at one end and to the plug 34 at the opposite end. The springs 37, 38 normally urge the table 28 to a position with the slider 35 centered intermediate the plugs 34. Since the springs 37, 38 are secured to the slider 35 and the respective plugs 34 on movement of the slider, the spring 37 will be compressed while the spring 38 is stretched, or vice versa.

The table 28 has a pair of handle knobs 39 adjacent the edge 31 thereof by means of which the table 28 is moved from its storage position to its horizontal position, and vice versa. A spring detent 40 is mounted on the edge 31 of the table 28 and cooperates with the top wall 16 of the case 14 to hold the table 28 in its closed position.

With the table in the position illustrated in Figures 1 and 3, the coil spring 38 is compressed while coil spring 37 is stretched to hold the table 28 in tight engagement with the top wall 16 of the case 14. When it is desired to use the table 28, the handles 39 are grasped and the table 28 is pressed downwardly to disengage the end 31 from the top wall 16, disengaging the spring detent 40. The table 28 is then pulled outwardly at the upper end thereof so that the shaft 36 of the slider 35 causes the cover plate 21 to move outwardly at an angle to the front of the case 14. With the table 28 in a horizontal position, the end 30 thereof is aligned with the generally rectangular socket 20 and the springs 37, 38 bias the table 28 in a direction to hold the end 30 thereof in the socket 20. The table 28 has the lower surface thereof resting on the horizontal upper edge 27 of the cover plate 21 so that the table 28 is supported rigidly when the end 30 thereof is positioned in the socket 20.

When the table 28 is to be folded to its storage position, the handles 39 are grasped and pulled outwardly, further stretching the spring 38 and compressing the spring 37. The end 30 of the table 28 leaves the socket 20 and the table 28 is swung toward the housing 14 and closed position. The end 30 of the table 28 is forced downwardly toward the bottom wall 17 of the case 14 by action of the springs 37, 38 cooperating with the slider 35 and plugs 34 and the table 28 is moved toward its storage position. The handles 39 are pressed downwardly toward the wall 17 so that the end 31 of the table 28 may be engaged under the top wall 16 of the case 14, as illustrated in Figures 1 and 3, where it is retained by the detent 40.

The table 28 has the upper surface thereof recessed to prevent objects from sliding off of the top thereof. The lower surface of the table 28 is offset at 41 to provide a flush fit of the table 28 with the plate 21 when the table 28 is in storage position.

Having thus described the preferred embodiment of the invention, it should be understood that numerous structural modifications and adaptations may be resorted to without departing from the scope of the appended claims.

What is claimed is:

1. A table for motor vehicles of the type including a seat having an upright back comprising a generally rectangular case adapted to be mounted in the rear face of the back of the seat, a transversely extending generally rectangular socket integrally formed in said case adjacent the upper edge thereof, a plate hingedly secured to the forward lower edge of said case, a table in said case, means interconnecting said table and said plate to support said table when in a horizontal position with the inner end thereof supported in said socket and to move said plate into engagement with the open side of said case when said table is moved to a storage position within said case, said case having a pair of oppositely disposed side walls having inwardly extending flanges thereon, a pair of spaced parallel side walls with outwardly extending flanges formed thereon on said plate, the flanges on said plate being adapted to engage the flanges on said side walls to limit the outward swinging movement of said plate with respect to said case, said means interconnecting said plate and said table including a pair of springs mounted in each of the opposite sides of said table, a slider positioned between said springs and normally maintained centrally of said table by action of said springs, and a stub shaft journalled in and extending outwardly from each of said sliders and rigidly mounted in said side walls on said plate.

2. A device as claimed in claim 1 wherein the means interconnecting said plate and said table maintains one end of said table in engagement with the top wall of said casing with said table in storage position.

References Cited in the file of this patent
UNITED STATES PATENTS

| | | |
|---|---|---|
| 1,511,925 | Wasmuth | Oct. 14, 1924 |
| 2,284,811 | Ferrelle | June 2, 1942 |